US007573621B2

(12) United States Patent
Yao

(10) Patent No.: US 7,573,621 B2
(45) Date of Patent: Aug. 11, 2009

(54) COLOR PRINTING

(75) Inventor: Meng Yao, West Linn, OR (US)

(73) Assignee: Xerox Corporation, Norwalk, CT (US)

( * ) Notice: Subject to any disclaimer, the term of this patent is extended or adjusted under 35 U.S.C. 154(b) by 611 days.

(21) Appl. No.: 11/358,011

(22) Filed: Feb. 21, 2006

(65) Prior Publication Data

US 2007/0195341 A1 Aug. 23, 2007

(51) Int. Cl.
*G03F 3/08* (2006.01)
*G06F 15/00* (2006.01)
*G06K 1/00* (2006.01)

(52) U.S. Cl. ........................................ 358/518; 358/1.9

(58) Field of Classification Search .................. 358/300
See application file for complete search history.

(56) References Cited

U.S. PATENT DOCUMENTS 6,023,344 A * 2/2000 Yabe .......................... 358/296
6,250,733 B1 * 6/2001 Yao et al. ...................... 347/15

OTHER PUBLICATIONS

U.S. Appl. No. 11/089,886, filed Mar. 24, 2005 by Meng Yao et al; Color Printing.
U.S. Appl. No. 11/089,887, filed Mar. 24, 2005 by Meng Yao et al; Color Prinitng.

* cited by examiner

*Primary Examiner*—King Y Poon
*Assistant Examiner*—David S Cammack
(74) *Attorney, Agent, or Firm*—Fay Sharpe LLP

(57) ABSTRACT

A method of printing a pixel defined by C, M, Y color values having a sum that is not less than a maximum allowed paper coverae max_cov, including assigning a maximum of the C, M, Y values to max_color; assigning a minimum of the C, M, Y values to min_color; selecting a black color value K that is not greater than a minimum of min_color and (C+M+Y-max_cov)/2; determining adjusted non-black primary color values Cout, Mout, Yout and a secondary value S_color such that the sum of the black color value K, the adjusted non-black primary color values Cout, Mout, Yout, and the secondary color value S_color is equal to the maximum allowed paper coverage max_cov; and half-toning K, Cout, Mout, Yout, and S_color.

15 Claims, 6 Drawing Sheets

FIG. 1
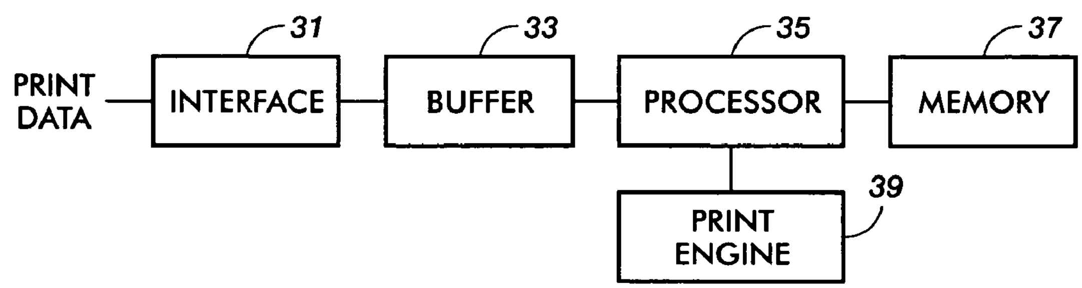
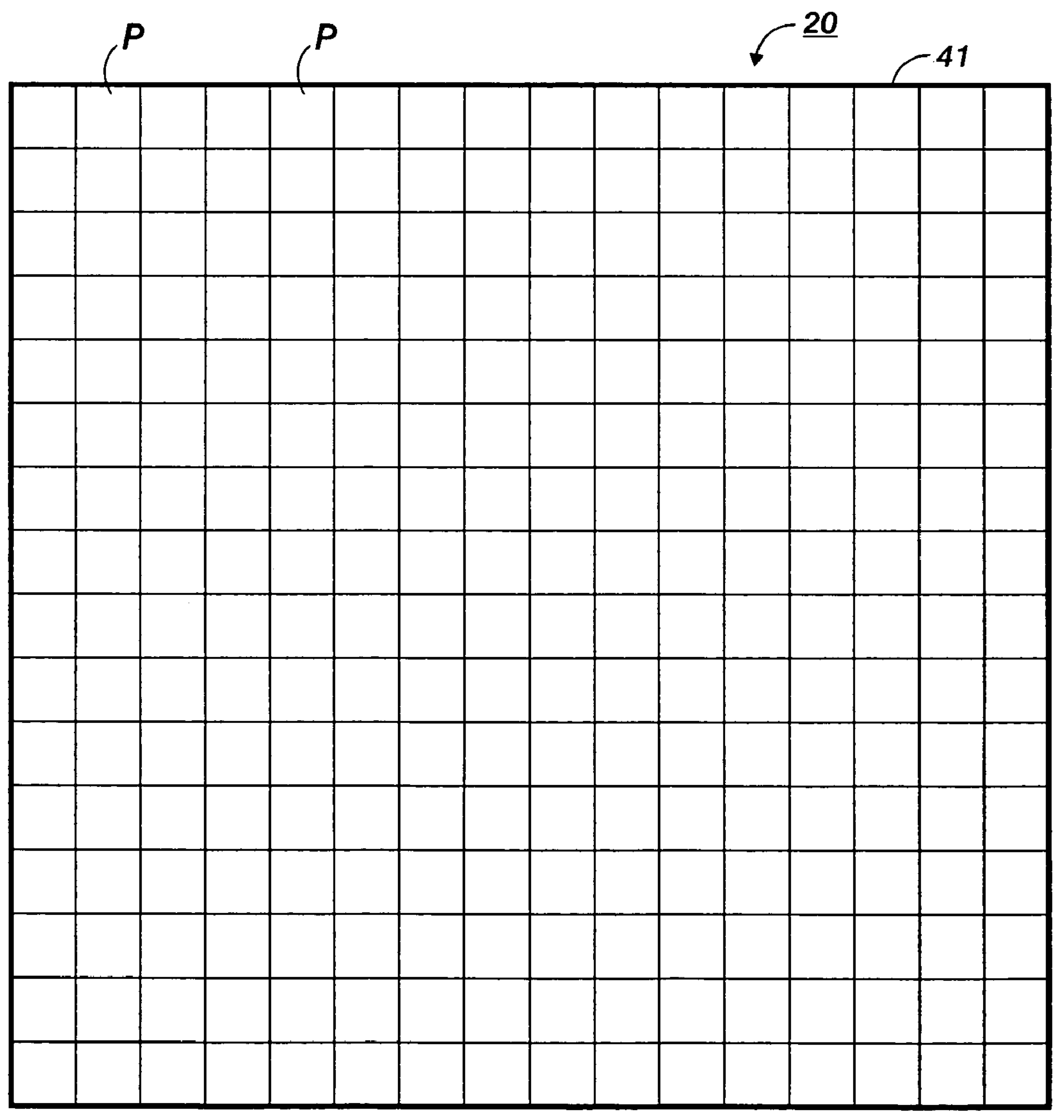
FIG. 2

| 184 | 11 | 224 | 51 | 252 | 17 | 114 | 241 | 128 | 79 | 22 | 140 | 57 | 215 | 160 | 49 |
|---|---|---|---|---|---|---|---|---|---|---|---|---|---|---|---|
| 236 | 69 | 133 | 107 | 170 | 70 | 196 | 38 | 155 | 191 | 228 | 90 | 185 | 104 | 27 | 86 |
| 115 | 163 | 40 | 209 | 2 | 142 | 96 | 220 | 73 | 119 | 55 | 162 | 13 | 254 | 141 | 208 |
| 8 | 187 | 244 | 81 | 183 | 238 | 29 | 171 | 12 | 246 | 35 | 205 | 126 | 43 | 177 | 61 |
| 145 | 101 | 23 | 154 | 116 | 52 | 137 | 201 | 103 | 147 | 181 | 85 | 230 | 76 | 111 | 239 |
| 44 | 217 | 63 | 229 | 32 | 210 | 92 | 59 | 225 | 66 | 123 | 9 | 151 | 212 | 16 | 194 |
| 82 | 122 | 178 | 132 | 74 | 172 | 253 | 5 | 165 | 42 | 240 | 199 | 98 | 50 | 130 | 159 |
| 30 | 251 | 3 | 202 | 106 | 18 | 143 | 113 | 197 | 138 | 78 | 33 | 175 | 247 | 65 | 222 |
| 169 | 88 | 152 | 46 | 237 | 189 | 67 | 219 | 25 | 105 | 214 | 156 | 121 | 4 | 186 | 109 |
| 203 | 53 | 221 | 124 | 77 | 158 | 39 | 95 | 168 | 245 | 14 | 68 | 233 | 93 | 148 | 20 |
| 97 | 136 | 15 | 176 | 34 | 213 | 135 | 234 | 45 | 87 | 146 | 193 | 37 | 207 | 48 | 243 |
| 60 | 232 | 192 | 94 | 250 | 108 | 0 | 190 | 125 | 206 | 58 | 112 | 164 | 83 | 131 | 179 |
| 1 | 157 | 72 | 26 | 153 | 54 | 166 | 75 | 21 | 161 | 226 | 10 | 255 | 24 | 223 | 117 |
| 91 | 211 | 127 | 235 | 118 | 200 | 227 | 100 | 248 | 47 | 134 | 182 | 99 | 149 | 56 | 195 |
| 249 | 62 | 19 | 180 | 41 | 84 | 28 | 144 | 188 | 110 | 71 | 36 | 204 | 80 | 174 | 31 |
| 102 | 150 | 198 | 89 | 139 | 216 | 173 | 64 | 6 | 218 | 167 | 242 | 120 | 7 | 231 | 129 |

*FIG. 5*

COLOR PRINTING

BACKGROUND

The subject disclosure is generally directed to color printer half-toning.

Raster type printers, which have been implemented with various print engines such as electrophotographic print engines and ink jet print engines, commonly employ half-toning to transform continuous tone image data to print data that can be printed as an array of dots that can be of substantially similar size. For example, 24 bit/pixel continuous tone image data can be half-toned to a plurality of single color one-bit per pixel bit-maps. It can be difficult to achieve substantially uniform or even distribution of the half-toned dots.

BRIEF DESCRIPTION OF DRAWINGS

FIG. 1 is a schematic block diagram of an embodiment of a printing system.

FIG. 2 is a schematic illustration of an embodiment of a pixel array.

FIG. 5 is a schematic diagram of an embodiment of a stochastic threshold array.

DETAILED DESCRIPTION

Figure 3:
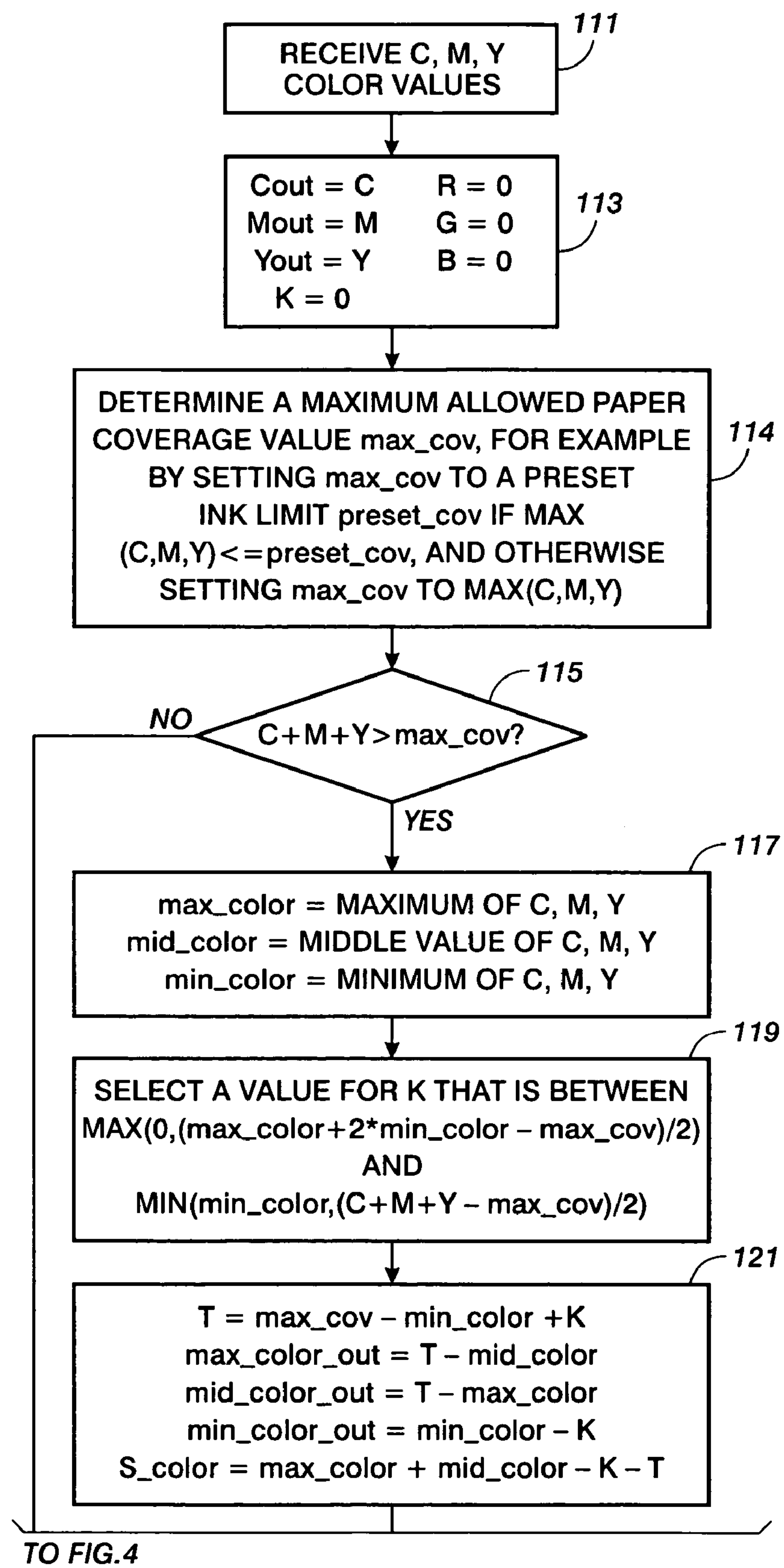
FIGS. 3 and 4 set forth is a schematic flow diagram of an embodiment of a procedure for printing a pixel of print data.

FIG. 1 is a schematic block diagram of an embodiment of a printing apparatus that includes an interface 31 that receives print data, for example from a host computer, and stores the print data in a buffer memory 33. A processor 35 is configured to process the print data to produce bit mapped raster data that is stored in a memory 37. A print engine 39 prints an image pursuant to the bit mapped raster data generated by the processor 35. The print engine 39 can be an electrophotographic print engine or an ink jet print engine, for example.

Printing is accomplished by selectively printing, depositing, applying or otherwise forming markings such as dots on a receiver surface or substrate that can be a print output medium such as paper or a transfer surface such as a transfer belt or drum. If a transfer surface is used, the image formed or printed on the transfer surface is appropriately transferred to a print output medium such as paper.

FIG. 2 is a schematic illustration of an embodiment of an array 20 of pixel locations P that can be used to define the locations on a print output medium 41 that can be marked or printed. A marking of a particular primary color (e.g., cyan magenta, yellow or black) that is printed or deposited at a pixel location can be conveniently called a dot.

Each pixel location P can, for example, be marked or printed with (a) one or more non-black primary color dots (e.g., cyan, magenta or yellow), (b) a black dot by itself, or (c) a black dot and at least one non-black primary color dot.

Print data typically comprises continuous tone data (such as 32-bit or 24-bit pixel data), and halftoning (e.g., using one or more halftone threshold arrays) is commonly employed to map or transform continuous tone data to a halftoned bit map that contains one bit per pixel per primary color plane, for example.

Figure 4:
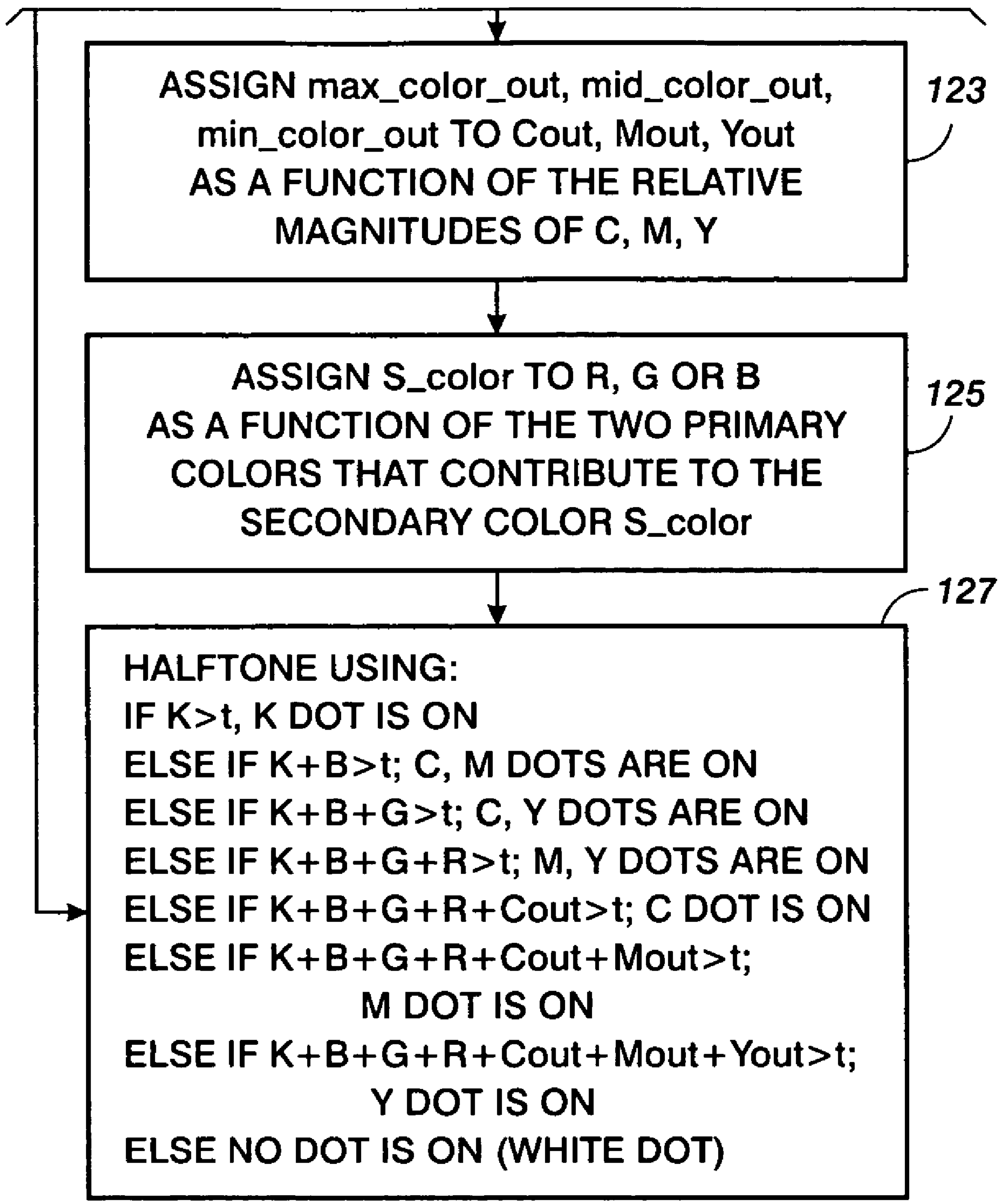

FIGS. 3 and 4 set forth a schematic flow diagram of an embodiment of a procedure for printing a pixel of C, M, Y print data. At 111 C, M, Y values are received. At 113 the values of C, M, Y are assigned to Cout, Mout, Yout; and K and the secondary color variables R (red), G (green) and B (blue) are initialized to zero (0). At 114 a maximum allowed paper coverage value max_cov is determined. For example, if the maximum of C, M, Y is less than or equal to a preset ink limit preset_cov, then max_cov can be set to preset_cov; otherwise max_cov can be set to the maximum of C, M, Y. In such example, max_cov is set to the greater of (1) a preset ink limit preset_cov and (2) the maximum of C, M, Y. The preset ink limit preset_cov can be less than a predetermined maximum color value that for example can be 255. At 115 a determination is made as to whether C+M+Y is greater than the maximum allowed paper coverage max_cov. If no, processing continues at 127.

If the determination at 115 is yes, at 117 the maximum of C, M, Y is assigned to max_color, the middle value of C, M, Y is assigned to mid_color, and the minimum of C, M, Y is assigned to min_color.

At 119 a value for K (black) is selected that is between a maximum of zero (0) and (max_color+2*min_color-max_cov)/2, and a minimum of min_color and (C+M+Y-max_cov)/2):

$$\mathrm{MAX}(0, (\mathrm{max\_color}+2*\mathrm{min\_color}-\mathrm{max\_cov})/2) \leqq K \leqq \mathrm{MIN}(\mathrm{min\_color}, (C+M+Y-\mathrm{max\_cov})/2) \quad \text{(Equation 1)}$$

At 121 values for T, max_color_out, mid_color_out, min_color out, and S_color are assigned as follows:

$$T=\mathrm{max\_cov}-\mathrm{min\_color}+K \quad \text{(Equation 2)}$$

$$\mathrm{max\_color\_out}=T-\mathrm{mid\_color} \quad \text{(Equation 3)}$$

$$\mathrm{mid\_color\_out}=T-\mathrm{max\_color} \quad \text{(Equation 4)}$$

$$\mathrm{min\_color\_out}=\mathrm{min\_color}-K \quad \text{(Equation 5)}$$

$$S\_\mathrm{color}=\mathrm{max\_color}+\mathrm{mid\_color}-K-T \quad \text{(Equation 6)}$$

Pursuant to the foregoing, the sum of K, max_color_out, mid_color_out, min_color_out and S-color is substantially equal to max_cov.

At 123 each of max_color_out, mid_color_out, min_color_out is assigned to an appropriate one of Cout, Mout, Yout, depending on the relative magnitudes of C, M, Y. For example, if C≧M≧Y, then Cout=max_color_out, Mout=mid_color_out, and Yout=min_color_out. If M≧Y≧C, then Cout=min_color_out, Mout=max_color_out, and Yout=mid_color_out. If Y≧C≧M, then Cout=mid_color_out, Mout=min_color_out, and Yout=max_color_out.

At 125, S_color is assigned to R, G ,or B as a function of which two of C, M or Y contribute to the secondary color S_color. This can be accomplished, for example, by determining whether C, M or Y is the minimum of C, M, Y. If C is the minimum, then S-color is assigned to R. If M is the minimum, then S_color is assigned to G. If Y is the minimum, then S_color is assigned to B.

At 127 half-toning is performed using the following Equation 7, for example using a single stochastic half-tone threshold array having threshold values t scaled to [0, 255] for the illustrative example wherein the predetermined maximum color value is 255. FIG. 5 schematically illustrates an embodiment of a stochastic half-tone threshold array that can be employed for half-toning.

If K>t, K dot is on

Else if $K+B>t$, $C$, $M$ dots are on

Else if $K+B+G>t$, $C$, $Y$ dots are on $$\text{Else if } K+B+G+R>t,\ M, Y \text{ dots are on}$$

$$\text{Else if } K+B+G+R+\text{Cout}>t,\ C \text{ dot is on}$$

$$\text{Else if } K+B+G+R+\text{Cout}+M\text{out}>t,\ M \text{ dot is on}$$

$$\text{Else if K+B+G+R+Cout+Mout+Yout>t, Y dot is on}$$

$$\text{Else no dot is on (white dot)} \quad \text{(Equation 7)}$$

Pursuant to the foregoing procedure, if C+M+Y is less than or equal to the maximum allowed paper coverage max_cov, a C dot, an M dot, a Y dot, or no dot is printed. Otherwise, a black color value K is selected, the color values for cyan, magenta and yellow are adjusted, and a secondary color value is determined in such a manner that the sum of K, Cout, Mout, Yout, and S_color are equal to max_cov. This can provide for the printing of a single primary color dot or a single secondary color; namely, a K dot, a C dot and an M dot, a C dot and a Y dot, an M dot and a Y dot, a C dot, an M dot, or a Y dot. In this manner, at most two overlapping dots can be printed at a pixel location, depending on the threshold value, and any such two overlapping dots comprise non-black primary colors that form a single secondary color B, G or R.

The equations for selecting K, adjusting the color values for cyan, magenta and yellow, and determining a secondary color value (Equations 1-6) can be arrived at as follows for the particular example wherein C≧M≧Y and C+M+Y>max_cov.

The C, M, Y color values can be broken down to three components: a gray component, a secondary color component, and a primary component that does not contribute to gray or a secondary color.

The gray component comprises the minimum of C, M, Y, which for this example is Y:

$$\text{gray}=\text{MIN}(C, M, Y)=Y \quad \text{(Equation 8)}$$

The gray component can be subtracted to arrive at versions C2, M2, Y2 that can be expressed in terms of C, M, Y:

$$C2=C-\text{gray}=C-Y \quad \text{(Equation 9)}$$

$$M2=M-\text{gray}=M-Y \quad \text{(Equation 10)}$$

$$Y2=Y-\text{gray}=0 \quad \text{(Equation 11)}$$

The secondary color in this example is blue, and since C>M, the value for blue can be expressed as follows:

$$\text{Blue}=M2=M-Y \quad \text{(Equation 12)}$$

Subtracting the secondary color component from C2, M2, Y2 results in:

$$C3=C2-\text{Blue}=C-M \quad \text{(Equation 13)}$$

$$M3=0 \quad \text{(Equation 14)}$$

$$Y3=0 \quad \text{(Equation 15)}$$

In this manner, the input color C, M, Y has been broken down into three components: a gray component, a secondary color component (in this case, Blue=M−Y), and a primary component (in this case C3=C−M). The primary component can be considered that portion of the maximum of C, M, Y that does not contribute to gray or a secondary color.

The gray component can be represented by either K or non-overlapping C, M, Y dot sets:

$$K+CMY=\text{gray}=Y \quad \text{(Equation 16)}$$

wherein CMY is the amount of non-overlapped C, M, Y dot sets that contribute to the gray component. Each count of CMY represents three non-overlapped dots—one C dot, one M dot and one Y dot.

Blue can be represented by either overlapped C, M dot sets or non-overlapped dot sets:

$$B+CM=\text{Blue}=M-Y \quad \text{(Equation 17)}$$

wherein B is the amount of overlapped C, M dot sets, and CM is the amount of non-overlapped C, M dot sets that contribute to blue. Each count of CM represents two non-overlapped dots, one C dot and one M dot.

Since this derivation is for C+M+Y>max_cov, the coverage by the three components (gray, secondary, and primary) should add up to max_cov. Coverage by the gray component comprises K dots and non-overlapped C, M, Y dots, and can be represented by K+3*CMY. Coverage by the secondary component comprises overlapped C, M (blue) dots and non-overlapped C, M dots, and can be represented by B+2*CM. Coverage by the primary component comprises C3 which can be represented by C−M. Therefore:

$$K+3*CMY+B+2*CM+C-M=\text{max\_cov} \quad \text{(Equation 18)}$$

Using Equation 16, (Y−K) can be substituted for CMY:

$$K+3*(Y-K)+B+2*CM+C-M=\text{max\_cov} \quad \text{(Equation 19)}$$

From the foregoing, CM can be expressed as:

$$CM=\text{max\_cov}-C-2*Y+2*K \quad \text{(Equation 20)}$$

Since CM≧0, it follows that:

$$\text{max\_cov}-C-2*Y+2*K\geqq 0 \quad \text{(Equation 21)}$$

The foregoing provides:

$$K\geqq(C+2*Y-\text{max\_cov})/2 \quad \text{(Equation 22)}$$

Since K cannot be less than 0, a lower value of K can be expressed as:

$$K\text{min}=\text{MAX}(0, C+2*Y-\text{max\_cov})/2) \quad \text{(Equation 23)}$$

for the condition where the coverages of the different components (gray, secondary and primary) add up to max_cov.

Substituting Equation 20 in Equation 17 provides the following equation for B (overlapping C, M dots):

$$B=M-Y-CM=C+M+Y-\text{max\_cov}-2*K \quad \text{(Equation 24)}$$

Since B≧0, the right side of the foregoing is greater than 0:

$$M-Y-CM=C+M+Y-\text{max\_cov}-2*K\geqq 0 \quad \text{(Equation 25)}$$

Rearranging the foregoing to isolate K provides:

$$K\leqq(C+M+Y-\text{max\_cov})/2 \quad \text{(Equation 26)}$$

Since CMY≧0, Equation 16 provides:

$$Y-K\geqq 0 \quad \text{(Equation 27)}$$

Rearranging the foregoing provides:

$$K\leqq Y \quad \text{(Equation 28)}$$

Pursuant to Equations 26 and 28, an upper bound for K under the condition that the coverages of different components add up to max-cov comprises a minimum of Y and (C+M+Y−max_cov)/2):

$$K\text{max}=\text{MIN}(Y, (C+M+Y-\text{max\_cov})/2) \quad \text{(Equation 29)}$$

The possible dot combinations are K, B (overlapped C, M), C, M, or Y. K is selected pursuant to Equations 23 and 29, and CMY, CM, and B can be obtained pursuant to Equations 16, 20 and 17:

$$CMY=Y-K \quad \text{(Equation 30)}$$

$$CM=\text{max\_cov}-C-2*Y+2*K \quad \text{(Equation 31)}$$

$$B=M-Y-CM \quad \text{(Equation 32)}$$

The amount of individual C dots, Cout, comprises the C dots from C3, CM, and CMY:

$$\begin{aligned} Cout &= C3+CM+CMY \\ &= C-M+Y-K+\text{max\_cov}-C-2*Y+2*K \\ &= \text{max\_cov}-M-Y+K \end{aligned} \quad \text{(Equation 33)}$$

The amount of individual M dots, Mout, comprises M dots from CM and CMY:

$$\begin{aligned} Mout &= CM+CMY \\ &= Y-K+\text{max\_cov}-C-2*Y+2*K \\ &= \text{max\_cov}-C-Y+K \end{aligned} \quad \text{(Equation 34)}$$

The amount of individual yellow dots comprises Y dots from CMY:

$$\begin{aligned} Yout &= CMY \\ &= Y-K \end{aligned} \quad \text{(Equation 35)}$$

Substituting T=max_cov−Y+K in the Equations 33 and 34 provides the following expressions for the cyan output color Cout, the magenta output color Mout, and the secondary color B:

$$\text{Cout}=T-M \quad \text{(Equation 36)}$$

$$\text{Mout}=T-C \quad \text{(Equation 37)}$$

$$B=C+M-K-T \quad \text{(Equation 38)}$$

Pursuant to the foregoing, the sum of K, Cout, Mout, Yout and B is equal to max_cov, and the K can be selected from a range of values between Kmin and Kmax, which allows the color values to be adjusted for different printer characteristics. For example, if K is minimized, the amount of color is maximized, which can result in high quality half-toned images on a variety of printers since K, the most visible color, is substantially reduced. However, on some printers, having a uniform layer of ink can reduce the amount of noise. When K is maximized, the secondary color is reduced, which can produce better image quality. Also, when K is maximized, the amount of color ink used is reduced, which can reduce the cost of printing.

Equations 23 and 29, the equation T=max_cov−Y+K, and Equations 36, 37, 35 and 38 are based on C≧M≧Y, and have been generalized to arrive at Equations 1-6 by substituting max_color for C, mid_color for M, and min color for Y, wherein Equation 1 is based on Equations 23 and 29.

Figure 6:
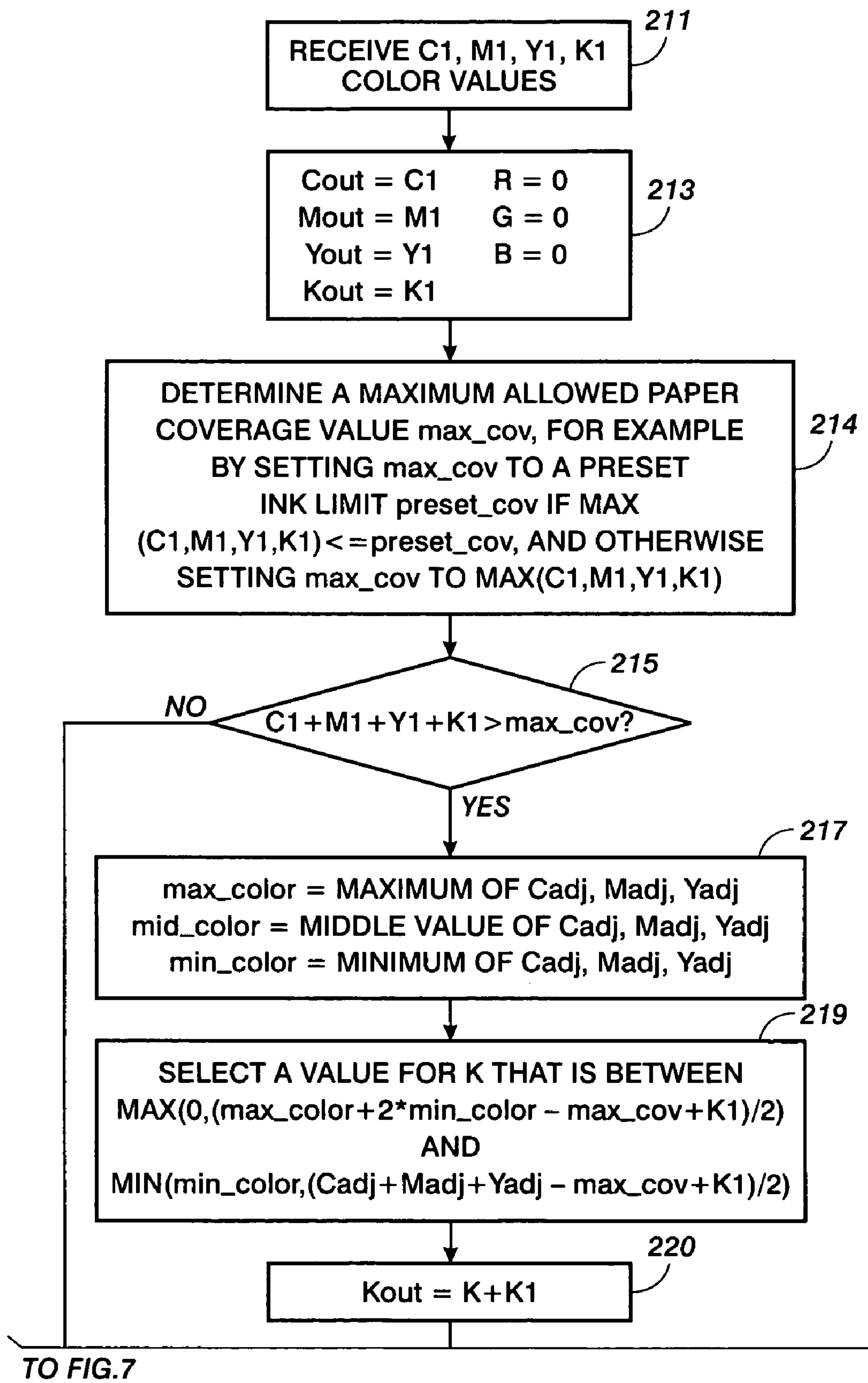
FIGS. 6 and 7 set forth a schematic flow diagram of an embodiment of another procedure for printing a pixel of print data.
Figure 7:
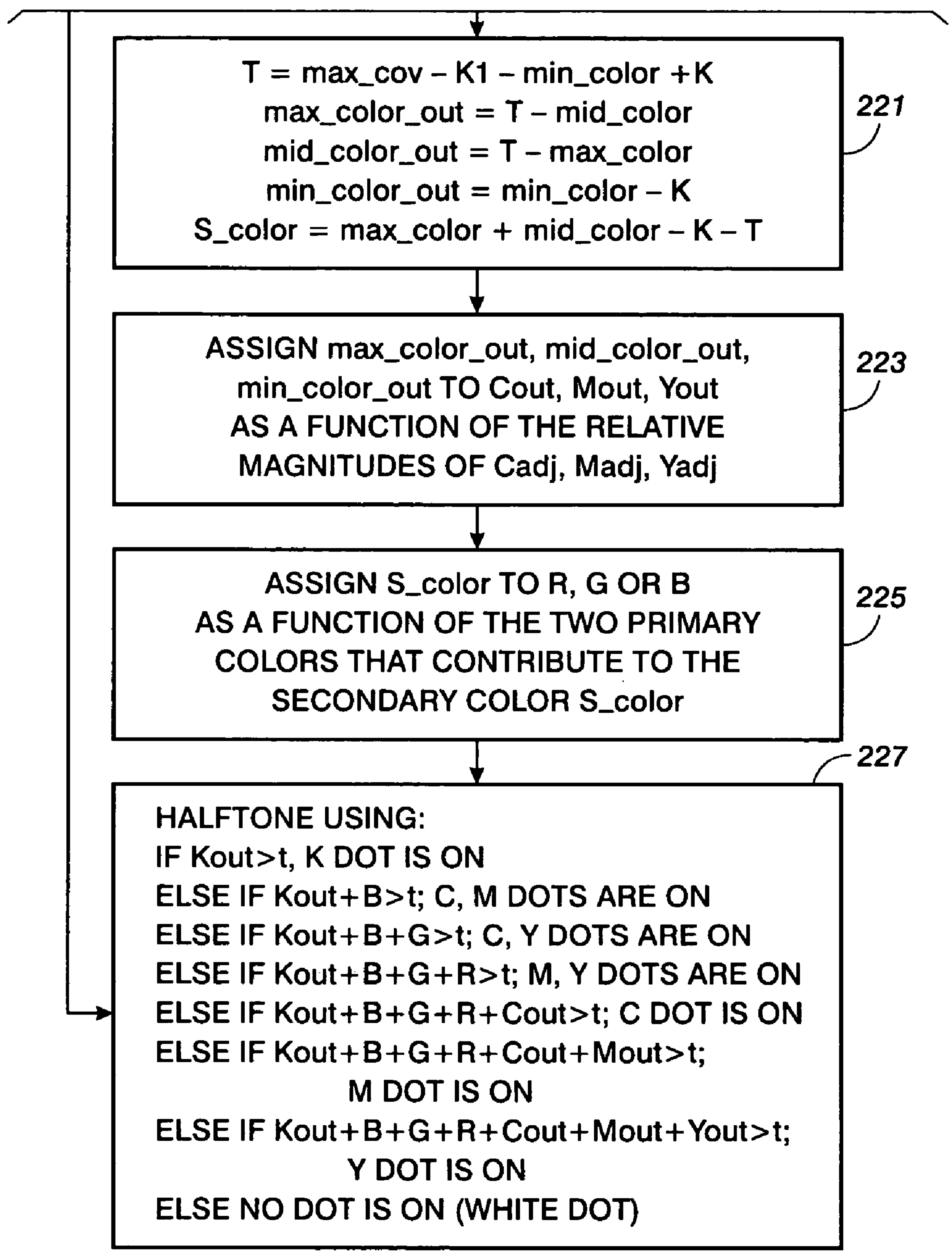

FIGS. 6 and 7 set forth a schematic flow diagram of an embodiment of a procedure for printing a pixel of CMYK print data. At 211 C1, M1, Y1, K1 input color values are received. At 213 the values of C1, M1, Y1, K1 are assigned to Cout, Mout, Yout, Kout; and secondary color variables R (red), G (green) and B (blue) are initialized to zero (0). At 214 a maximum allowed paper coverage value max_cov is determined. For example, if the maximum of C1, M1, Y1, K1 is less than or equal to a preset ink limit preset_cov, then max_cov can be set to preset_cov; otherwise max_cov can be set to the maximum of C1, M1, Y1, K1. The preset ink limit preset_cov can be less than a predetermined maximum color value such as 255. At 215 a determination is made as to whether C1+M1+Y1+K1 is greater than the maximum allowed paper coverage value max_cov. If no, processing continues at 227.

If the determination at 215 is yes, at 216 values for CMY are adjusted as follows based on the assumption that K overlapping C, M or Y will produce K:

$$C\text{adj}=\text{MIN}(C1,\ \text{max\_cov}-K1) \quad \text{(Equation 39)}$$

$$M\text{adj}=\text{MIN}(M1,\ \text{max\_cov}-K1) \quad \text{(Equation 40)}$$

$$Y\text{adj}=\text{MIN}(\text{Y1},\ \text{max\_cov}-\text{K1}) \quad \text{(Equation 41)}$$

Pursuant to the foregoing, the color values for C, M, Y are adjusted to arrive at effective amounts Cadj, Madj, Yadj which more closely approximate the effective contributions of cyan, magenta and yellow to the output color. In other words, cyan, magenta or yellow that is overlapped by black produces black, and the underlying cyan, magenta or yellow does not contribute to the output color. Black. occupies K1, which leaves max_cov−K1 as the area where cyan, magenta or yellow would contribute to the output color.

At 217 the maximum of Cadj, Madj, Yadj is assigned to max_color, the middle value of Cadj, Madj, Yadj is assigned to mid_color, and the minimum of Cadj, Madj, Yadj is assigned to min_color. At 219 a value of K (black) is selected as follows:

$$\text{MAX}(0,\ (\text{max\_color}+2*\text{min\_color}-\text{max\_cov}+K1)/2) \leqq K \leqq \text{MIN}(\text{min\_color},\ (C\text{adj}+M\text{adj}+Y\text{adj}-\text{max\_cov}+K1)/2) \quad \text{(Equation 42)}$$

At 220 K1 is added to the value of K determined at 219 to arrive at a black output color value Kout:

$$K\text{out}=K+K1 \quad \text{(Equation 43)}$$

At 221 values for T, max_color_out, mid_color_out, min_color out, and S_color are assigned as follows:

$$T=\text{max\_cov}-K1-\text{min\_color}+K \quad \text{(Equation 44)}$$

$$\text{max\_color\_out}=T-\text{mid\_color} \quad \text{(Equation 45)}$$

$$\text{mid\_color\_out}=T-\text{max\_color} \quad \text{(Equation 46)}$$

$$\text{min\_color\_out}=\text{min\_color}-K \quad \text{(Equation 47)}$$

$$S\text{\_color}=\text{max\_color}+\text{mid\_color}-K-T \quad \text{(Equation 48)}$$

The equations at 219 and 221 are similar to the equations at 119 and 121 of FIG. 3, except that max_cov is replaced by (max_cov−K1) which is the maximum coverage for C, M or Y. Further, at 220 K1 is added to K to arrive at a black output color value Kout.

Pursuant to the foregoing, the sum of Kout, max_color_out, mid_color_out, min_color_out and S-color is substantially equal to max_cov.

At 223 each of max_color_out, mid color_out, min_color_out is assigned to an appropriate one of Cout, Mout, Yout, depending on the relative magnitudes of Cadj, Madj, Yadj. For example, if Cadj≧Madj≧Yadj, then Cout=max_color_out, Mout=mid_color_out, and Yout=min_color_out. If Madj≧Yadj≧Cadj, then Cout=min_color_out, Mout=max_color_out, and Yout=mid_color out. If Yadj≧Cadj≧Madj, then Cout=mid_color_out, Mout=min_color_out, and Yout=max_color_out.

At 225, S_color is assigned to R, G , or B as a function of which two of Cadj, Madj or Yadj contribute to the secondary color S_color. This can be accomplished, for example, by determining whether Cadj, Madj or Yadj is the minimum of Cadj, Madj, Yadj. If Cadj is the minimum, then S-color is assigned to R. If Madj is the minimum, then S_color is assigned to G. If Yadj is the minimum, then S_color is assigned to B.

At 227 half-toning is performed using the following, for example using a single stochastic half-tone threshold array having threshold values t scaled to [0, 255] for the illustrative example wherein the predetermined maximum color value is 255. FIG. 4 schematically illustrates an embodiment of a stochastic half-tone threshold array that can be employed for half-toning.

If Kout>t, K dot is on

Else if Kout+B>t, C, M dots are on

Else if Kout+B+G>t, C, Y dots are on

Else if Kout+B+G+R>t, M, Y dots are on

Else if Kout+B+G+R+Cout>t, C dot is on

Else if Kout+B+G+R+Cout+Mout>t, M dot is on

Else if Kout+B+G+R+Cout+Mout+Yout>t, Y dot is on

Else no dot is on (white dot) (Equation 49)

Pursuant to the procedure of FIG. 5, if C1+M1+Y1+K1 is less than a maximum allowed paper coverage value max_cov, a K, C, M, Y, or no dot is printed. Otherwise, the cyan, magenta and yellow color values are initially adjusted on the assumption that cyan, magenta or yellow overlapping with black produces black, a black color value Kout is selected on the basis of the initially adjusted cyan, magenta and yellow values and K1, the initially adjusted cyan, magenta and yellow color values are further adjusted, and a secondary color value is determined in such a manner that the sum of Kout, Cout, Mout, Yout, and S_color are equal to max_cov. This provides for the printing of a single primary color dot or a single secondary color; namely, a K dot, a C dot and an M dot, a C dot and a Y dot, an M dot and a Y dot, a C dot, an M dot, or a Y dot. In this manner, at most two overlapping dots can be printed at a pixel location, depending on the threshold value, and such two overlapping dots comprise non-black primary colors that form a single secondary color.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method of transforming a pixel defined by received C, M, Y color values having a sum that is not less than a maximum allowed paper coverage max_cov that is set to a greater of (1) a preset ink limit preset_cov and (2) the maximum of the C,M, Y color values, into K, Cout, Mout, Yout, and S-Color values, comprising:

receiving values C, M, and Y from a host computer;

storing print data C, M, and Y in a computer buffer memory;

assigning a maximum of the C, M, Y values to max_color;

assigning a middle of the C, M, Y values to mid_color;

assigning a minimum of the C, M, Y values to min_color;

selecting a black color value K that is not greater than a minimum of min_color and (C+M+Y−max_cov)/2;

obtaining a max_color_out value by calculating (T−mid_color), wherein T=max_cov−min_color+K;

obtaining a mid_color_out value by calculating (T−max_color);

obtaining a min_color_out value by calculating (min_color−K);

obtaining a secondary color value S_color by calculating (max_color+mid_color−K−T);

assigning through use of a computer processor, each of max_color_out, mid_color_out and min_color_out to one of Cout, Mout or Yout depending on the relative magnitudes of the C, M, Y color values such that:

if C>M>Y, then Cout=max_color_out, Mout=mid_color_out and Yout=min_color-out;

if M>Y>C, then Cout=min_color_out, Mout=max_color_out, and Yout=mid_color_out;

if Y>C>M, then Cout=mid_color_out, Mout=min_color_out, and Yout=max_color-out; and half-toning K, Cout, Mout, Yout, and S_color, in order to transform continuous tone data into half toned bit map that contains one bit per pixel per primary color.

2. The method of claim 1 wherein selecting a black color value K that is not greater than a minimum of min_color and (C+M+Y−max_cov)/2 comprises selecting a black color value K that is not greater than a minimum of min_color and (C+M+Y−max_cov)/2 and not less than a maximum of zero and (max_color+2*min_color-max_cov)/2.

3. The method of claim 1 wherein half-toning K, Cout, Mout, Yout and S_color comprises half-toning K, Cout, Mout, Yout and S-color using a single threshold array.

4. A method of transforming a pixel defined by received C, M, Y color values having a sum that is not less than a maximum allowed paper coverage max_cov that is set to a greater of (1) a preset ink limit preset_cov and (2) the maximum of the C, M, Y color values, into K, Cout, Mout, Yout, and S_color comprising:

receiving print data color values C, M, and Y received from a host computer;

storing print data color values C, M, and Y into a computer buffer memory;

assigning a maximum of the C, M, Y values to max_color;

assigning a minimum of the C, M, Y values to min_color;

selecting a black color value K that is not greater than a minimum of min_color and (C+M+Y−max_cov)/2;

determining through use of a print data configured computer processor, non-black primary color output values Cout, Mout, Yout and a secondary value S_color such that the sum of the black color value K, the non-black primary color output values Cout, Mout, Yout, and the secondary color value S_color is equal to the maximum allowed paper coverage max_cov; and half-toning K, Cout, Mout, Yout, and S_color in order to transform continuous tone data into half-toned bit map data.

5. The method of claim 4 wherein selecting a black color value K that is not greater than a minimum of min_color and (C+M+Y−max_cov)/2 comprises selecting a black color value K that is not greater than a minimum of min_color and (C+M+Y−max_cov)/2 and not less than a maximum of zero and (max_color+2*min_color-max_cov)/2.

6. The method of claim 5 wherein half-toning K, Cout, Mout, Yout and S_color comprises half-toning K, Cout, Mout, Yout and S_color using a single threshold array.

7. The method of claim 6, wherein the single threshold array uses a single stochastic half-tone threshold array ranging in value scaled to between zero and 255.

8. The method of claim 7, wherein if C+M+Y is less than or equal to the maximum allowed paper coverage max_cov, then at least one of a C dot, an M dot or a Y dot is printed.

9. The method of claim 7, wherein if C+M+Y is greater than the maximum allowed paper coverage max_cov, then a black dot value K is selected, the color values cyan, magenta and yellow are adjusted, and a secondary color value is determined.

10. The method of claim 4 wherein half-toning K, Cout, Mout, Yout and S_color comprises half-toning K, Cout, Mout, Yout and S_color using a single threshold array.

11. A method of transforming a pixel defined by received C, M, Y color values having a sum that is not less than a maximum allowed paper coverage max_cov that is set to a greater of (1) a preset ink limit preset_cov and (2) the maximum of the C, M, Y color values, into K, Cout, Mout, Yout, and S_color values comprising:

receiving print data values C, M, and Y from a host computer;

storing print data C, M, and Y in a computer buffer memory;

assigning a maximum of the C, M, Y values to max_color;

assigning a middle of the C, M, Y values to mid_color;

assigning a minimum of the C, M, Y values to min_color;

selecting a black color value K that is not greater than a minimum of min_color and (C+M+Y−max_cov)/2;

obtaining a max_color_out value by calculating (T−mid_color), through use of a computer processor wherein T=max_cov−min_color+K;

obtaining a mid_color_out value by calculating (T−max_color);

obtaining a min_color_out value by calculating (min_color−K);

obtaining a secondary color value S_color by calculating (max_color+mid_color−K−T);

assigning through use of a computer processor configured to process print data, each of max_color_out, mid_color_out and min_color_out to one of Cout, Mout or Yout depending on the relative magnitudes of the C, M, Y color values; and half-toning K, Cout, Mout, Yout, and S_color.

12. The method of claim 11 wherein selecting a black color value K that is not greater than a minimum of min_color and (C+M+Y−max_cov)/2 comprises selecting a black color value K that is not greater than a minimum of min_color and (C+M+Y−max_cov)/2 and not less than a maximum of zero and (max_color+2*min_color-max_cov)/2.

13. The method of claim 11, wherein the C, M, Y color values are broken down into the components of a gray component, secondary color component, and a primary component.

14. The method of claim 13, wherein the gray component comprises the minimum of C, M, Y.

15. The method of claim 13, wherein the secondary color is equal to one of C, M, Y.

* * * * *